United States Patent [19]

Seha

[11] 4,076,735
[45] Feb. 28, 1978

[54] PROCESS FOR THE MANUFACTURE OF AMINOANTHRAQUINONES

[75] Inventor: Zdenek Seha, Basel, Switzerland

[73] Assignee: Ciba-Geigy AG, Basel, Switzerland

[21] Appl. No.: 612,811

[22] Filed: Sep. 12, 1975

[30] Foreign Application Priority Data

Sep. 20, 1974   Switzerland .................... 12793/74

[51] Int. Cl.² .............................................. C09B 1/16
[52] U.S. Cl. ................................... 260/378; 260/380; 260/381; 260/382
[58] Field of Search ................ 260/378, 382, 380, 381

[56] References Cited

U.S. PATENT DOCUMENTS

| | | | |
|---|---|---|---|
| 2,273,966 | 2/1942 | Klein | 260/378 |
| 2,738,354 | 3/1956 | Kern et al. | 260/378 X |
| 3,417,090 | 12/1968 | Pelster et al. | 260/378 UX |
| 3,933,866 | 1/1976 | Seha | 260/382 |
| 3,933,867 | 1/1976 | Thiem et al. | 260/382 |
| 3,969,374 | 7/1976 | Thiem et al. | 260/378 X |

FOREIGN PATENT DOCUMENTS

| | | | |
|---|---|---|---|
| 126,542 | 9/1900 | Germany | 260/378 |
| 2,300,592 | 7/1974 | Germany | 260/378 |

*Primary Examiner*—Paul F. Shaver
*Attorney, Agent, or Firm*—Prabodh I. Almaula; Edward McC. Roberts

[57] ABSTRACT

A process for the manufacture of aminoanthraquinones, wherein nitroanthraquinones are reacted in dipolar aprotic solvents which contain $-SO_2-$ or $-SO-$ groups and are inert to the reactants, with aliphatic, aliphatic-aromatic, cycloaliphatic, substituted or unsubstituted primary or secondary amines of the formulae $R-NH_2$ or $R-R'-NH$, in which R and R' are radicals that are the same or different, such as alkyl, aralkyl, cycloalkyl, hydroxyalkyl radicals of 1 to 8 carbon atoms.

4 Claims, No Drawings

PROCESS FOR THE MANUFACTURE OF AMINOANTHRAQUINONES

The present process provides a process for the manufacture of aminoanthraquinones from nitroanthraquinones, wherein that nitroanthraquinones are reacted in dipolar aprotic solvents which contain —$SO_2$— or —SO— groups and are inert to the reactants, with aliphatic, aliphatic-aromatic, cycloaliphatic, substituted or unsubstituted primary or secondary amines of the formulae R—$NH_2$ or R—R'—NH, wherein R and R' are radicals which are the same or different, such as alkyl, aralkyl, cycloalkyl, hydroxyalkyl radicals of 1 to 8 carbon atoms.

The reaction proceeds in accordance with the reaction equation

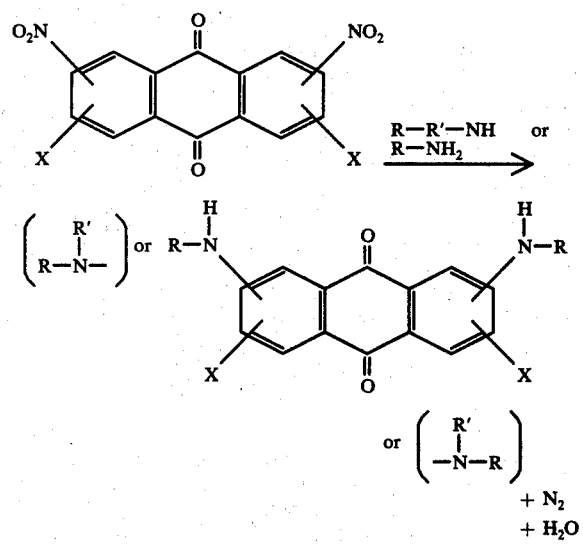

wherein R and R' have the meaning assigned to them hereinbefore and X represents a functional substituent, e.g. the carboxyl, sulpho, hydroxy, amino or halogen group, which can be attached to the anthraquinone nucleus direct or through a bridge member. The reaction can be carried out with monoanthraquinones and/or dinitroanthraquinones.

The aminoanthraquinones which can be obtained by the process according to the invention are known and constitute useful dyes or dyestuff intermediates.

The aminolysis of nitroanthraquinones is described in German Pat. Nos. 136,777, 136,778 and 144,634, but polar solvents are used therein as reaction media, such as water, alcohols or pyridine. The use of polar solvents as reaction media results in only very poor yields being obtained and lengthy reaction times are needed. For example, a yield of only 70% of 1-isopropylaminoanthraquinone is obtained after 100 hours on reacting 1-nitroanthraquinone with a 300% excess of isopropylamine at 75° C.

In the process according to the invention on the other hand, aminoanthraquinones are obtained surprisingly in very high and often even in quantitative yields. The products are obtained in a high degree of purity, so that in most cases it is no longer necessary to purify them. The reaction conditions are simple and the reaction course is easily kept under control. In respect of the apparatus used no problems regarding corrosion or of a technical nature arise and the recovery of the solvents employed presents no difficulties. The reaction proceeds uniformly and virtually no residues result, so that the novel process also marks a considerably advance, particularly from the ecological standpoint.

After the aminolysis, the solvent employed can be regenerated almost completely by simple distillation.

As examples of aminoanthraquinones which can be manufactured by the process according to the invention there may be cited:

1-isopropylaminoanthraquinone, 1-isobutylamino-2-methylanthraquinone, 1-methylaminoanthraquinone, 1-diethylaminoanthraquinone, 1-cyclohexylaminoanthraquinone, sodium 1-isopropylaminoanthraquinone-6/7-sulphonate, 1-isobutylaminoanthraquinone, 1-diisopropyl-, 1-diisobutyl- and 1-dicyclohexylaminoanthraquinone, 1-isopropylamino-2-methylanthraquinone and 1-cyclohexylamino-2-methylanthraquinone.

The aminolysis is carried out in conventional reaction vessels or autoclaves. A suitable apparatus is the rotary evaporator or, for batches produced on an industrial scale, the paddel drier (Venulett). The reaction temperature will be at least 80° C. The preferred reaction temperature is between 110° and 160° C. The aminolysis can be carried out both under pressure and without pressure. It is preferred to operate without pressure. The length of the reaction is from ½ hour to 15 hours, preferably from 1 to 3 hours.

The weight ratio of the dipolar aprotic solvent as reaction medium to the nitroanthraquinone is advantageously from 4:1 to 10:1.

The amine used according to the invention can be passed into the reaction mixture in the gaseous form or added thereto in liquid form. The amounts of amine to be used are close to the stoichiometric requirement. When using an excess of amine, the maximum excess of 100%, referred to the necessary stoichiometric amount.

As especially suitable solvents which can be used according to the invention there may be mentioned dipolar aprotic solvents which contain —$SO_2$— or —SO— groups and have a dielectric constant of at least 30, for example open-chain or cyclic low molecular sulphones of the formulae

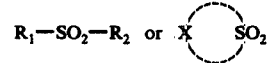

wherein each of $R_1$ and $R_2$ is a straight-chain or branched alkyl group of 1 to 4 carbon atoms or a phenyl group which is substituted by low molecular alkyl groups, halogen atoms or nitro groups or is unsubstituted, and X is a straight-chain or branched hydrocarbon chain of 4 to 10 atoms which is substituted by halogen atoms or acetoxy groups or is unsubstituted. Examples of such sulphones are dialkyl sulphones, e.g. dimethyl sulphone, methyl ethyl sulphone, diethyl sulphone, methyl-n-propyl sulphone, methyl isopropyl sulphone, methyl-n-butyl sulphone, ethyl isobutyl sulphone, methyl-(1-methylbutyl)-sulphone or diisopropyl sulphone; alkylenesulphones, e.g. tetramethylenesulphone, 3-methyltetramethylenesulphone or pentamethylenesulphone, hexamethylenesulphone; diphenyl sulphones, e.g. 4,4'-dichlorodiphenyl sulphone or 2,4-dimethyldiphenyl sulphone and bis-(alkylsulphonyl)-alkanes, e.g. bis-(methylsulphonyl)-methane, bis-(ethylsulphonyl)-methane or bis-(ethylsulphonyl)-dimethylmethane. It is also possible to use mixtures of the above solvents according to the invention. It is preferred to use tetramethylenesulphone, dimethyl sulphone or dimethyl sulphoxide.

The following Examples illustrate the process according to the invention but do not restrict it to what is described therein. The parts are by weight.

EXAMPLE 1

12.7 parts of 1-nitroanthraquinone and 63.5 parts of tetramethylenesulphone are heated to 140° C in an agitator flask which is equipped as a rotary evaporator. At this temperature, gaseous monomethylamine is bubbled into the solution at a uniform rate over the course of approximately 1 hours. The reaction mixture is subsequently stirred for about ½ hour. The water and methanol formed during the reaction are continuously distilled off and are removed. The nitrogen that forms is continuously expelled by bubbling in fresh monomethylamine. When the reaction is terminated, the tetramethylenesulphone is completely distilled off in vacuo. The residue consists of pure 1-methylaminoanthraquinone. Yield: over 90%.

EXAMPLE 2

14.9 parts of 1,5-dinitroanthraquinone and 135 parts of tetramethylenesulphone are heated in a rotary evaporator flask to app. 145° C and gaseous monomethylamine is bubbled in at this temperature. By proceeding further as described in Example 1, pure 1,5-dimethylaminoanthraquinone is obtained in over 98% yield.

EXAMPLE 3

12.7 parts of 1-nitro-2-methoxy-anthraquinone and 63.5 parts of tetramethylenesulphone are heated to 140°–145° C in a flask (advantageously with rotary evaporator attached). At this temperature, gaseous dimethylamine is bubbled into the solution over the course of 2 hours. The process is carried out in a closed system and the excess dimethylamine is recycled. When the reaction is terminated, dimethylnitrosoamine and water are first removed and then tetramethylenesulphone is completely distilled off in vacuo. The residue consists of 1-dimethylamino-2-methoxy-anthraquinone in over 98% yield.

EXAMPLE 4

12.7 parts of 1-nitroanthraquinone and 63.5 parts of tetramethylenesulphone are heated in a flask to 140°–145° C. At this temperature, a mixture of 8.9 parts of isopropylamine and 8.9 parts of tetramethylenesulphone are added dropwise to the reaction solution. The reaction mixture is then stirred for ½ to 1 hour with reflux cooling. When the reaction is terminated, water and isopropanol are first removed and then the tetramethylenesulphone is completely distilled off in vacuo. The residue consists of 1-isopropylaminoanthraquinone in 99.2% yield.

EXAMPLES 5 to 8

By carrying out the process under the same conditions as described in Example 4 and using another sulphone compound, e.g. dimethyl sulphone, as solvent instead of tetramethylenesulphone, and also by substituting for isopropylamine in each case an equivalent amount of the following compounds as aminating reagent:

a. n-butylamine
b. cyclohexylamine
c. aniline
d. isobutylamine the corresponding aminoanthraquinone derivatives are obtained in over 98% yield.

EXAMPLES 9 AND 10

33.5 parts of the sodium salt of 1-nitroanthraquinone-6-sulphonic acid or of 1-nitroanthraquinone-7-sulphonic acid are heated in 195 parts of tetramethylenesulphone in a rotary evaporator flask to 140°–145° C. At this temperature, a mixture of 17.7 parts of isopropylamine in 17.7 parts of tetramethylenesulphone are added dropwise in the course of 2 hours and the reaction mixture is further stirred for 1 hours. Upon termination of the reaction, the reaction mixture is poured into 1500 parts of water and the product is salted out, filtered off and dried. The yield of pure sodium salt of 1-isopropylaminoanthraquinone-6-sulphonic acid or of 1-isopropylaminoanthraquinone-7-sulphonic acid is over 99%.

I claim:

1. A process for the manufacture of aminoanthraquinones, wherein mononitroanthraquinone or dinitroanthraquinone or mononitroanthraquinone or dinitroanthraquinone substituted by alkoxy, carboxyl, sulpho, hydroxy, amino or halogen, is reacted in dipolar aprotic solvents which contain —SO$_2$— or —SO— groups and are inert to the reactants, with aliphatic, aliphaticaromatic, cycloaliphatic, substituted or unsubstituted primary or secondary amines of the formulae R—NH$_2$ or R—R'—NH, in which R and R' are radicals that are the same or different alkyl, aralkyl, cycloalkyl, hydroxyalkyl radicals of 1 to 8 carbon atoms.

2. A process according to claim 1, wherein the reaction is carried out at temperatures between 80° and 160° C.

3. A process according to claim 1, wherein dialkyl sulphones, alkylenesulphones, diphenyl sulphones, bis-(alkylsulphonyl)-alkanes or dialkyl sulphoxides are used as dipolar aprotic solvents.

4. A process according to claim 1, wherein tetramethylenesulphone, dimethyl sulphone or dimethyl sulphoxide is used as solvent.

* * * * *